(12) United States Patent
Cathey et al.

(10) Patent No.: US 12,735,875 B1
(45) Date of Patent: Sep. 15, 2026

(54) LIQUID COLLECTION SYSTEM

(71) Applicants: Michelle Alane Cathey, Flagstaff, AZ (US); Edward Shaw, Flagstaff, AZ (US)

(72) Inventors: Michelle Alane Cathey, Flagstaff, AZ (US); Edward Shaw, Flagstaff, AZ (US)

(73) Assignee: MADFUNCTIONAL LLC, Flagstaff, AZ (US)

( * ) Notice: Subject to any disclaimer, the term of this patent is extended or adjusted under 35 U.S.C. 154(b) by 0 days.

(21) Appl. No.: 19/635,555

(22) Filed: Mar. 31, 2026

Related U.S. Application Data

(60) Provisional application No. 63/795,904, filed on Apr. 28, 2025.

(51) Int. Cl.

| | |
|---|---|
| ***G01N 1/12*** | (2006.01) |
| ***A45B 3/00*** | (2006.01) |
| ***E03B 3/04*** | (2006.01) |
| ***E04H 4/14*** | (2006.01) |

(52) U.S. Cl.
CPC .................. *E03B 3/04* (2013.01); *A45B 3/00* (2013.01); *E04H 4/14* (2013.01); *G01N 1/12* (2013.01)

(58) Field of Classification Search
CPC .... E03B 3/04; A45B 3/00; G01N 1/12; E04H 4/14
USPC .................................................... 294/181, 26
See application file for complete search history.

(56) References Cited

U.S. PATENT DOCUMENTS

| | | | | |
|---|---|---|---|---|
| 2,064,696 | A | 12/1936 | Smith et al. | |
| 2,213,937 | A | 9/1940 | Tompkins et al. | |
| 2,447,771 | A | 8/1948 | Rogers | |
| 3,675,491 | A * | 7/1972 | Guillet | G01N 1/08 73/864.63 |
| 3,677,596 | A | 7/1972 | Yonaites et al. | |
| 3,688,483 | A | 9/1972 | Hamilton | |
| 3,754,785 | A | 8/1973 | Anderson | |
| 3,757,737 | A | 9/1973 | Drum et al. | |
| 4,021,994 | A | 5/1977 | Mainprice | |
| 4,705,310 | A | 11/1987 | Scripter | |
| 4,754,656 | A * | 7/1988 | Charm | G01N 1/12 73/864.91 |
| 5,137,623 | A * | 8/1992 | Wall | E04H 4/1609 210/474 |
| 5,400,572 | A | 3/1995 | Peck et al. | |
| 5,442,970 | A * | 8/1995 | Hutchins | G01N 1/12 73/864.63 |

(Continued)

*Primary Examiner* — Paul T Chin
(74) *Attorney, Agent, or Firm* — Invention To Patent Services; Alex Hobson

(57) ABSTRACT

A water collection system includes a container prop that is configured to extend across a liquid container opening of a liquid container and retain the liquid container to the container prop and also is configured to detachably attach to an elongated member, such as a hiking pole to enable extending the hiking pole out into a body of water to submerge the liquid container opening to collect water from the body of water into the liquid container. The container prop has a prop body that has retainer hooks extending from the prop body to retain a liquid container or a container adaptor and has a pole seat with a constricted seat opening that is configured to extend over an elongated member, such as the pole shaft of a hiking pole.

24 Claims, 9 Drawing Sheets

(56) References Cited

U.S. PATENT DOCUMENTS

| | | | | | |
|---|---|---|---|---|---|
| 5,537,881 | A * | 7/1996 | White | G01N 1/12 | 73/864.63 |
| 5,676,411 | A | 10/1997 | Kwok | | |
| 5,753,831 | A * | 5/1998 | Mohs | G01N 1/12 | 73/864.63 |
| D417,320 | S * | 11/1999 | Nunez | D30/162 | |
| 7,014,231 | B1 * | 3/2006 | Callen | G01N 1/12 | 294/181 |
| 9,925,647 | B2 * | 3/2018 | Lafond | G01N 1/02 | |
| 10,801,226 | B2 * | 10/2020 | Capps | E04H 4/14 | |
| 11,208,776 | B1 | 12/2021 | Judd | | |
| 11,221,278 | B2 * | 1/2022 | Briseno | G01N 1/20 | |
| 2009/0288503 | A1 * | 11/2009 | Breil | G01N 1/12 | 73/864.63 |
| 2012/0091174 | A1 | 4/2012 | Breeze | | |
| 2013/0062895 | A1 | 3/2013 | Groth et al. | | |
| 2016/0089118 | A1 * | 3/2016 | Petersilia | A61B 10/007 | 600/573 |
| 2021/0070543 | A1 | 3/2021 | Breeze | | |
| 2024/0384485 | A1 | 11/2024 | Rodriguez et al. | | |

* cited by examiner 50
56
54
61
51
57
60
57'
52
62
60'
512

80
56
50
54
83
522
61
511
685
62
52
60
60'
82
85
58
58'
88
51

50
54
80
61
51
57
60
57'
52
62
60'
85
82

LIQUID COLLECTION SYSTEM

CROSS REFERENCE TO RELATED APPLICATIONS

This application claims the benefit of priority to U.S. provisional patent application No. 63/795,904, filed on Apr. 28, 2025; the entirety of which is hereby incorporated by reference herein.

BACKGROUND OF THE INVENTION

Field of the Invention

The invention relates to a liquid collection system that utilizes a container prop configured to hold a liquid container with the mouth open and couple to an elongated member, such as a hiking pole to enable retrieval of water from a body of water by extending the hiking pole out into the water and submerging the mouth of the water container.

Background

Backpacking often requires collecting water from natural sources, such as streams, creeks, ponds, lakes, rivers, and the like. Collecting the water can be difficult as there may be rocks, weeds, mud and other obstacles that create difficulties or hazards to maneuvering right to the edge of the body of water. Also, the edge of water can be slippery as it may be covered with moss or algae which can result in falls and injury. Also, when trying to reach out to dunk a container in the water, a person's feet and/or shoes can get wet, and wet shoes in cold environments can lead to frostbite. Also, wet shoes or boots can result in blisters when walking long distance.

Many natural bodies of water may be muddy along the water edge or sandy and the water may gradually get deeper. Therefore, it is difficult to fill a water container without getting mud, sand or other debris in the container.

When reaching out to collect water in a water container from a natural body of water, the water container can be dropped, especially when the body of water is a moving body of water, such as a stream or river. The water container may fill with water and pull out of the person's hand, or they may slip on a slippery rock and drop the water container to watch it being swept away.

SUMMARY OF THE INVENTION

A water collection system includes a container prop that is configured to extend across a liquid container opening of a liquid container and retain the liquid container to the container prop and also is configured to detachably attach to an elongated member, such as a hiking pole to enable extending the hiking pole out into a body of water to submerge the liquid container opening to collect water from the body of water into the liquid container. The water collection system therefore makes water collection from a natural body of water safer and reduces the likelihood of collecting mud, sand or other debris in the liquid container as the point of collection is offset from the water's edge.

A water collection system includes a container prop configured to hold the container opening of a liquid container open via a retainer component, such as retainer hooks extending from the container prop. The container prop has a prop body that has the retainer component, such as retainer hooks extending from a first end and a second end, respectively, of the prop body. A retainer component is configured to detachably attach with a liquid container or container adaptor to secure the liquid container to the container prop. The retainer components may be detachably attachable to the liquid container on opposing sides of the container opening to hold the container opening open while collecting water. A retainer component may include hooks, clips, buttons, snaps, tethers, straps and/or hook-and-loop fastener. A retainer hook however may be preferred as the retainer hook may be easy to configure through container apertures or apertures in the container adaptor and also because the engagement is secure and is less likely to detach as a button or snap or hook-and-loop fastener.

The retainer hooks each may have an extension portion that extends out from the prop body and a hook portion that extends upward toward the top of the prop body to an extended end. The retainer hooks may have a hook head on the extended end that is bulbous, enlarged and may be spherical in shape, to retain the liquid container thereon.

A water container may have apertures in the water container that may be configured over the retainer hooks to secure the liquid container to the container prop. A liquid container may be flexible, such as a bag or bladder, or flexible bucket, and may have apertures in the liquid container or in tabs extending from the liquid container, that can be configured over the retainer hooks to secure the liquid container to the container prop. A flexible liquid container may be a hydration bladder that has a hose extending therefrom to enable drinking from a valve on the end of the hose. A flexible container may be a bag, a flexible container that has a rigid container opening, such as from Katadyn, Cyber Court, CA, or may be a collapsible bottle, such as from CNOC, Portland, OR. A collapsible bottle may have a container mouth with container threads and a flexible bottle or collapsible bottle attached thereto. A water container may also be a rigid water container, such as a Nalgene water container, from Nalge Nunc International Corporation, Rochester NY.

In some cases, the water container is secured to the container prop by a container adaptor, wherein the container adaptor has an adaptor opening configured to extend over the container opening and two adaptor extensions, extending in opposing directions from the adaptor opening ring, extending around the adaptor opening, and having an adaptor extension aperture, preferably located proximal to an extended end of the adaptor extension. The adaptor extension apertures may be configured on the retainer component, such as on the retainer hooks to secure the liquid container to the container prop.

An adaptor opening diameter may be sized to fit conventional container openings. The adaptor opening diameter may therefore be about 25 mm or more, about 40 mm or more, about 50 mm or more, about 100 mm or more and any range between and including the diameters provided. A standard hard bottle used for backpacking typically has a 100-415 thread, a standard closure size. The designation "100-415" refers to a 100 mm outer diameter with a 415 neck finish, defining the thread style and dimensions. This wide-mouth design allows for convenient filling, pouring, and cleaning. The 100-415 thread is a relatively large opening also that better enables quick filling by submersion and also better airflow during dispensing. The adaptor opening may therefore be substantially 100 mm or from about 95 mm to about 105 mm to ensure a tight fit on the 100-415 thread liquid container opening. A container adaptor or portions thereof may be a flexible material and may be a planar layer of material. The first and second extension portions may be flexible to enable the extension portions to be flexed upward from the adaptor opening ring to secure the adaptor extension apertures to the retainer component, such as retainer hooks.

The container prop is configured to be retained on an elongated member, a pole, such as the pole shaft of a hiking pole. The pole or elongated member may be detachably attached to the pole seat of the container prop. The pole seat includes a pole seat aperture that extends from the first side to a second, opposing side of the container prop, and has a seat constricted opening to the pole seat aperture along the bottom side of the container prop. The pole seat may be configured centrally between the first extension portion and second extension portion of the prop body. Also, the prop body may have seat tapering surfaces that extend to the seat constricted opening and these tapering surfaces may aid in locating the pole or elongated member in the pole seat. The width of the seat constricted opening may be less than a diameter of the pole seat aperture and this may require the prop body, or the opposing first extension portion and second extension portion of the prop body to flex to enable the pole shaft to extend through the seat constricted opening. The prop body may be required to flex outward, wherein the first extension portion extending from the pole seat aperture to the first end and second extension portion, extending from the pole seat aperture to the second end, may bend or deform slightly to enable the elongated member, or hiking pole shaft to fit through the seat constricted opening. The prop body may act as a living hinge to enable insertion and removal of a pole shaft in the pole seat aperture.

The center of the pole seat aperture may be configured a vertical offset distance from the extension portions with respect to the base of the prop body. This offset distance may help to create a torque on the prop body to close or pinch the seat constricted opening around the pole shaft of the hiking pole to secure the container prop and liquid container coupled thereto to the hiking pole during water collection.

The container prop also may have a handle and may extend from a first end to a second end. The handle may be flexible, such as a rope or strap and may extend through apertures in the prop body.

A hiking pole may be a preferred elongated member for retaining the container prop and liquid container to the hiking pole for collecting water from a natural body of water. A hiking pole has a pole shaft and a basket that prevents the container prop and liquid container coupled thereto from sliding off the tip end of the hiking pole when collecting water from natural body of water.

The container adaptor may be thin, as shown in FIG. 12, having a thickness of about 10 mm or less, about 8 mm or less, about 5 mm or less and any range between and including the values provided. The container adaptor may be made of a flexible material that enables the adaptor opening 44 to be enlarged slightly to extend over a container mouth and securely retain the liquid container during retrieving water. The container adaptor may be elastic, wherein the container adaptor can be deformed, such as enlarging the adaptor opening, and then rebound back to an original shape, size or length upon removal of the deforming force.

The container prop may be made out of a plastic or polymeric material and preferably is a pliable material that enables flexing of the first and second extension portions to allow an elongated member to pop into the pole seat aperture, through the seat constricted opening. A preferred material is a polyurethan, such as a TPU thermoplastic polyurethane 95A.

A method of collecting water from a natural body of water is provided by the container prop described herein. The method includes providing the container prop as described herein and attaching a liquid container to the container prop via the retainer hooks and with the container opening propped open. The container prop extends across the container opening. The method also includes detachably attaching the container prop to an elongated member, such as the shaft or pole shaft of a hiking pole. The pole shaft may be secured in the pole seat aperture of the pole seat by forcing the pole shaft through the seat constricted opening. Now, with the liquid container attached to the container prop and the container prop coupled to the elongated member (hiking pole), the elongated member may be extended by hand out over a body of water. A person may hold one end of the elongated member or pole, such as by holding the handle of the hiking pole and extend the tip end of the hiking pole with the container prop and liquid container coupled thereto over the water. The extended end of the hiking pole or elongated member may then be moved down to submerge the container opening of the liquid container in the water to flow water into the liquid container. The pole or elongated member may then be retrieved from the water and detached from the container prop. A container closure may then be attached over the container opening with water now retained in the liquid container.

A liquid container has a liquid retainer portion that may be rigid, such as a free standing bottler, or may be collapsible or may be flexible and be configured to fold over upon itself and expand as liquid is filled into the liquid retainer portion.

An elongated member, as used herein has a length along a length axis from a first end, such as a handle where the elongated member is held, to an extended end that is 10 times or more, and preferably 20 or 30 or more times the cross-length dimension, such as diameter. An elongated member may be circular in cross-section across the length axis and may have a cross-length dimension, such as diameter of 15 mm or more, about 20 mm or more, about 25 mm or more, or even 30 mm or more and any range between and including the diameter values provided. An elongated member may be a hiking pole, a tent pole or a natural elongated member, such as a stick and preferably a stick with an enlarged end to retain the container prop on the stick without the container prop sliding off the end of the stick.

The summary of the invention is provided as a general introduction to some of the embodiments of the invention and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
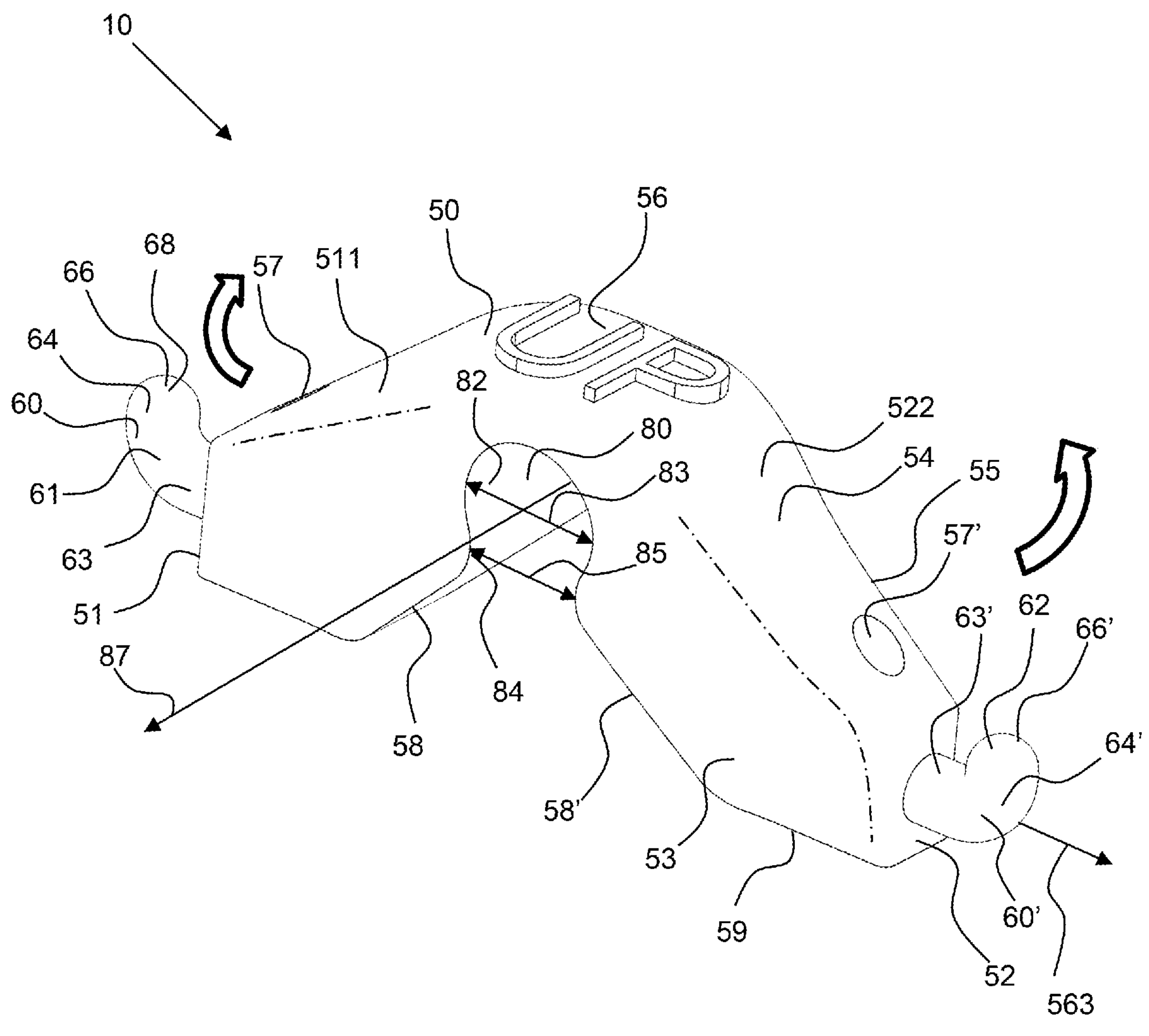
FIG. 1 shows a perspective view of a container prop having a prop body that has retainer components, retainer hooks extending from a first end and a second end of the prop body, and a pole seat extending from a first side to a second side of the prop body, having a seat constricted opening along a base side of the prop body to receive the pole shaft therein.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to employ the present invention.

DETAILED DESCRIPTION OF THE ILLUSTRATED EMBODIMENTS

As used herein, the terms “comprises,” “comprising,” “includes,” “including,” “has,” “having” or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of “a” or “an” are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 2:
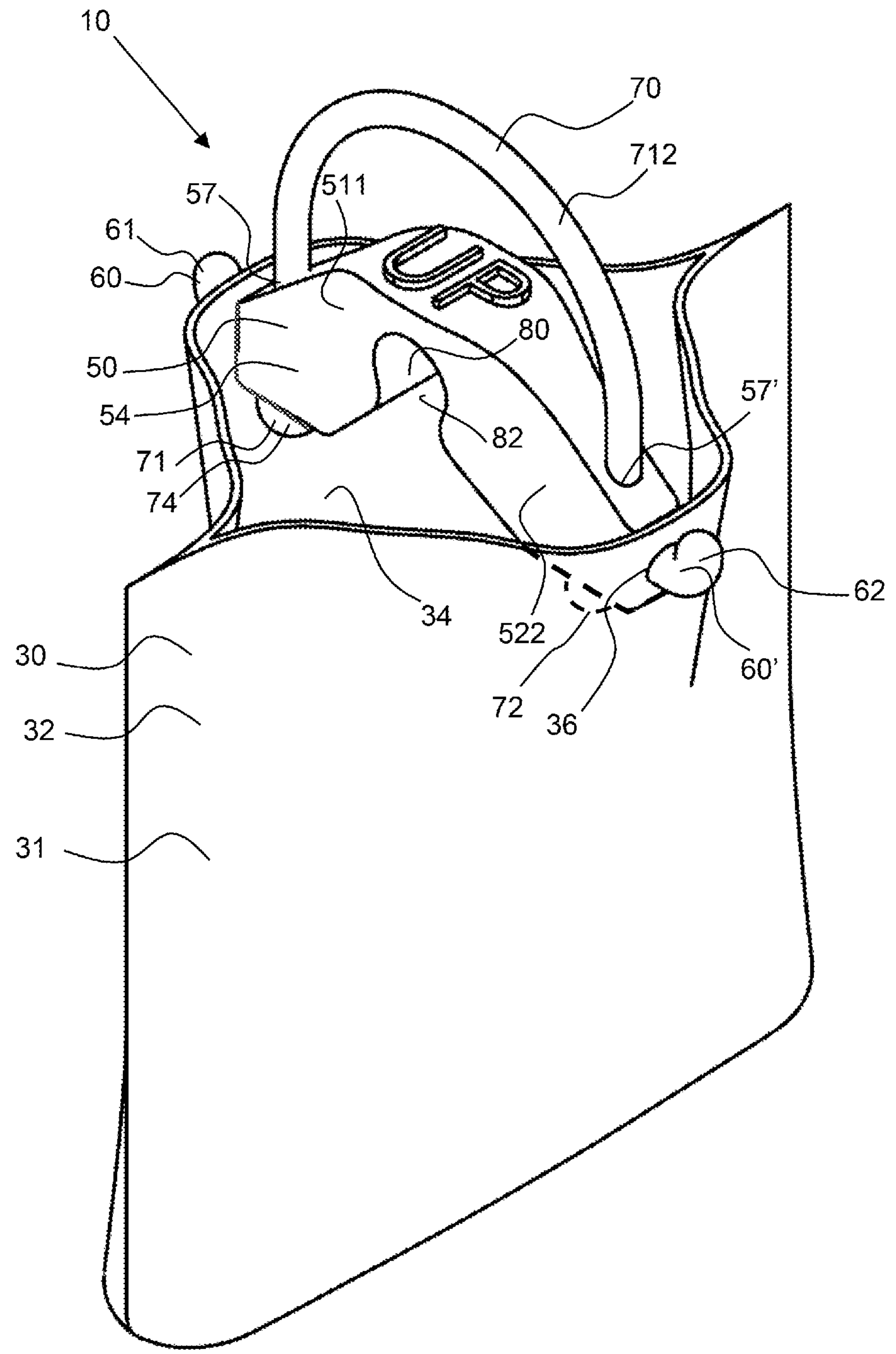
FIG. 2 shows a perspective view of a container prop propping open a liquid container with the retainer components, retainer hooks extending through apertures in the container to hold the container opening open to retrieve water therein.
Figure 3:
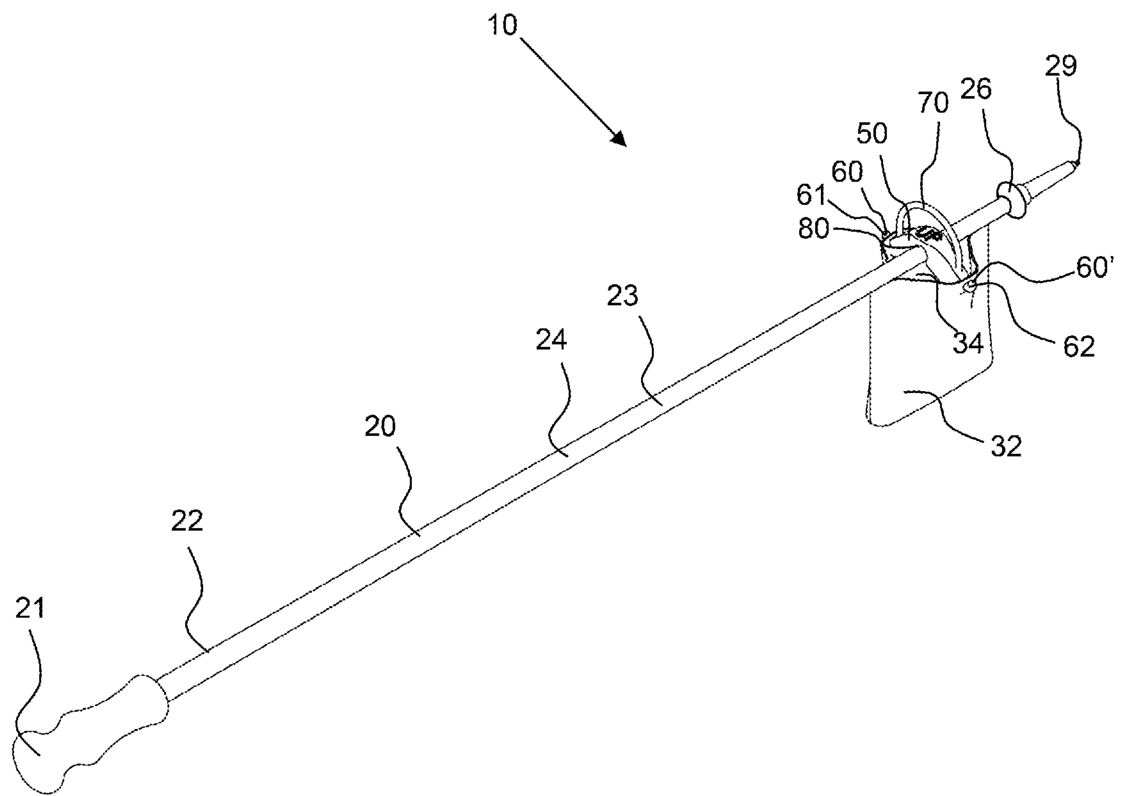
FIG. 3 shows a perspective view of a water collection system that includes a container prop coupled to a hiking pole by a pole seat extending around the pole shaft above the basket of the hiking pole, and extending across the container opening of a liquid container, a hydration bladder or bag, and having retainer components, retainer hooks on either end that extend through container apertures to hold the hydration bladder open to retrieve water from a water source, such as a creek or pond from an offset distance.
Figure 4:
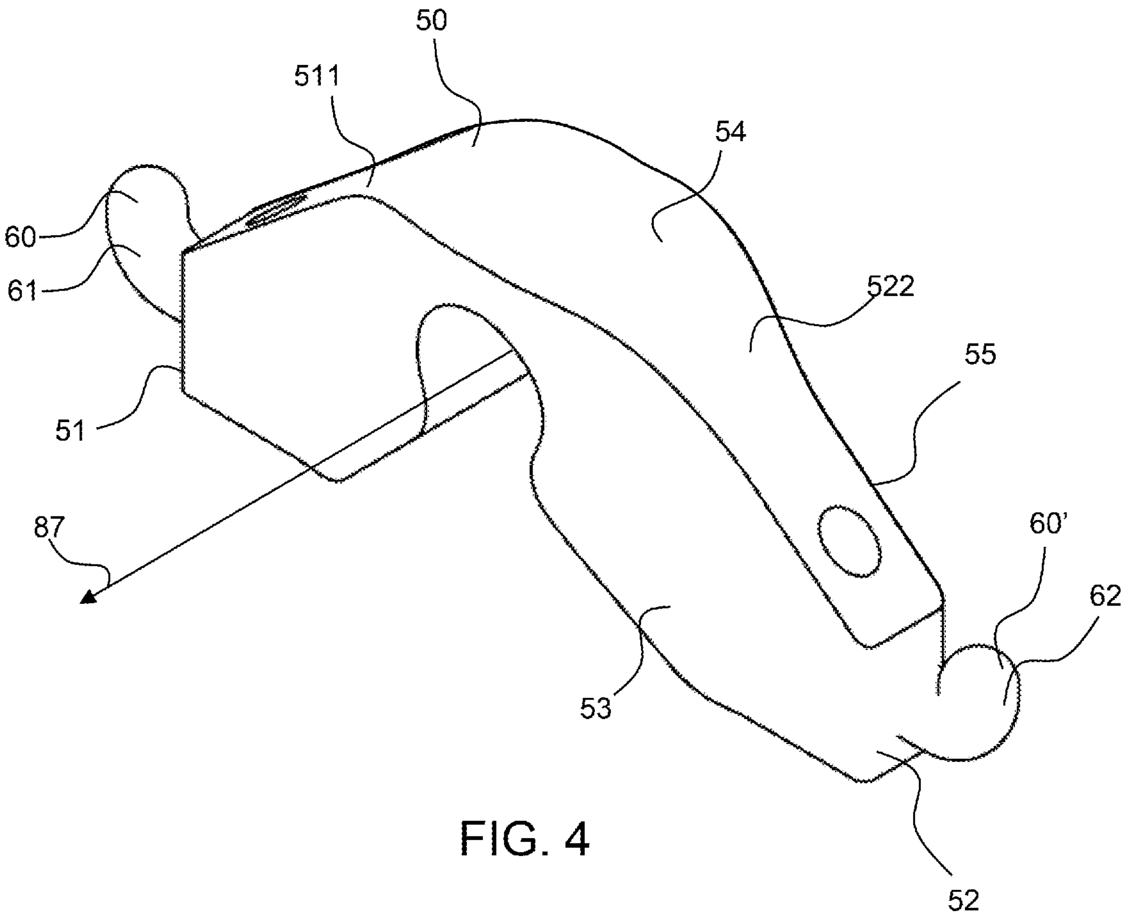
FIG. 4 shows a perspective view of a container prop.
Figure 5:
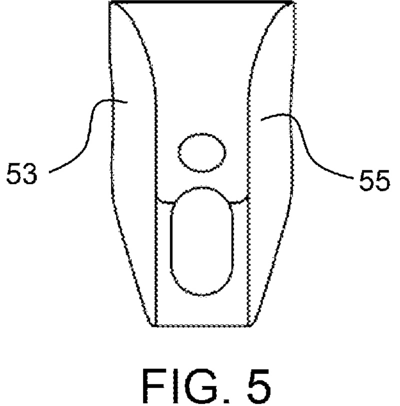
FIG. 5 shows a left end view of a container prop.
Figure 6:
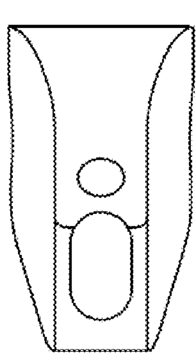
FIG. 6 shows a right end view of a container prop.

Referring to FIGS. 1 to 3, a water collection system 10 includes a container prop 50 configured to hold the container opening 34 of a liquid container 30 open via the retainer components 60, 60', retainer hooks 61, 62 extending from the container prop 50 and the pole shaft 24 of a hiking pole 20 extending through the pole seat aperture 82 of the pole seat 80 in the prop body 54 of the container prop 50.

The container prop 50 has a prop body 54 that has retainer components 60, 60', retainer hooks 61, 62 extending from a first end 51 and a second end 52, respectively, of the prop body. Also, the container prop 50 has a pole seat 80 extending from a first side 53 to a second side 55 of the prop body 54 along pole seat axis 87, having a seat constricted opening 84 to the pole seat aperture 82. The width 85 of the seat constricted opening 84 may be less than a diameter 83 of the pole seat aperture 82 and this may require the prop body 54, or the opposing first extension portion 511 and second extension portion 522 of the prop body to flex to enable the pole shaft 24 to extend through the seat constricted opening 84. Also, the prop body has opposing seat tapering surfaces 58, 58' that extend from the base 59 of the prop body to the seat constricted opening 84 to guide the shaft of the hiking pole into the pole seat aperture 82. The prop body may be required to flex outward, wherein the first extension portion 511 extending from the pole seat aperture 82 to the first end 51 and second extension portion 522, extending from the pole seat aperture 82 to the second end, may bend or deform slightly to enable the hiking pole shaft to fit through the seat constricted opening (indicated by the bold curved arrows). The prop body may act as a living hinge to enable insertion and removal of a pole shaft in the pole seat aperture.

The container prop has retainer components 60, 60', such as retainer hooks 61, 62 extending from a first end 51 and a second end 52, and each retainer hook has an extension portion 63, 63', respectively, that extends out along a length axis 563 of the prop body 54 and a hook portion 64, 64', respectively, that extends upward toward the top 56 of the prop body to an extended end 66, 66', respectively. The retainer hooks may have a hook head 68 on the extended end 66 that is bulbous, enlarge and may be spherical in shape, to retain the liquid container thereon.

The center of the pole seat aperture 82 is configured a vertical offset distance from the extension portions with respect to the base 59 of the prop body 54. This offset distance may help to create a torque on the prop body 54 to close or pinch the seat constricted opening 84 around the pole shaft 24 of the hiking pole 20 to secure the container prop 50 and liquid container 30 coupled thereto to the hiking pole during water collection.

As shown in FIG. 2, a liquid container 30, has a liquid retainer portion 31 that is flexible, and is a hydration bladder 34, is coupled to and held open by a container prop 50, having retainer components 60, 60', retainer hooks 61, 62 extending from a first end and a second end of the prop body 54 and through container apertures 36 in the hydration bladder. The container prop also has a handle 70, that may have a handle extension 712 that extends from a first end 71 to a second end 72 and through the handle apertures 57, 57' in the prop body 54. The handle extension 712 may be a rope or cord and the handle retainer 74 may be a knot in the handle retainer that is larger than the handle aperture in the container prop. As shown in FIG. 2, the container opening 34 of the liquid container 30 is held open with the container prop 50 extending across the container opening and partially within the liquid container. Also, the container opening 34 is configured below the pole seat aperture 82.

As shown in FIG. 3, a water collection system 10 includes a container prop 50 coupled to a hiking pole 20 by a pole seat 80 extending around the pole shaft 24 above the basket 26 of the hiking pole. The pole shaft 24 is an elongated member 23 having a length that is at least 10 times a diameter or cross-length dimension. The basket 26 prevents the container prop and liquid container 30 coupled thereto from sliding off the tip end 29 of the hiking pole when retrieving water from a distant location, such as a creek or pond. The prop body 54 of the container prop 50 is extending across the container opening 34 of a liquid container 30, a hydration bladder 32, and has retainer components 60, 60', retainer hooks 61, 62 on either end that extend through container apertures 36 to hold the hydration bladder open to retrieve water from a water source, such as a creek or pond from an offset distance.

Referring now to FIGS. 4 to 9, the container prop has a symmetric prop body with respect to the pole seat axis 87 with a first extension portion 511 extending to a first end 51 and a second extension portion 522 extending to a second end 52, and retainer hooks 61, 62 extending from the first end 51 and second end 52 respectively. The prop body 54 has a length 512 from the first end 51 to the second end 52. The word "UP" as shown in FIGS. 1 and 3, and 14 and 15 may be molded as a protrusion or indentation in the prop body 52 and is an optional feature and therefore is not shown in FIGS. 4 to 9. Also, the handle and the handle aperture 57 are optional features and therefore shown in dashed lines.

Figures 7, 8, 9:
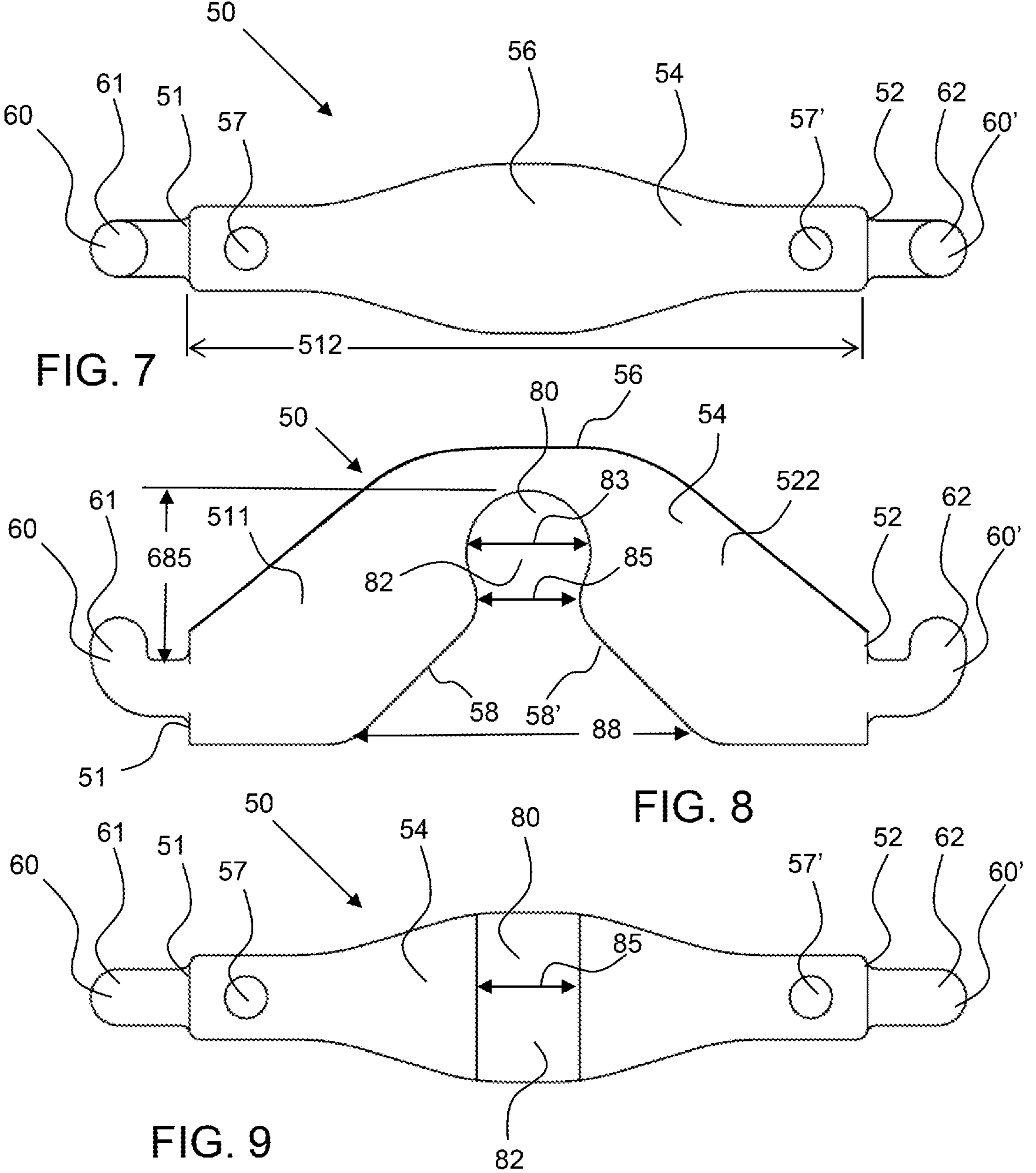
FIG. 7 shows a top view of a container prop.
FIG. 8 shows a side view of a container prop.
FIG. 9 shows a bottom or base side view of a container prop.

As shown in FIG. 8, the retainer component 60 and more specifically the extension portion 63 of the retainer component extends from the prop body 54 a vertical offset distance 685 from the pole seat aperture 82. This vertical offset distance may in positioning the container opening of the liquid container below the elongated member where it extends through the pole seat 80. Also, the seat tapering surfaces 58, 58' has a seat tapering width 88 that is much greater than the seat constricted opening 84 and these tapering surfaces aid in locating an elongated member into the pole seat aperture.

Figure 10:
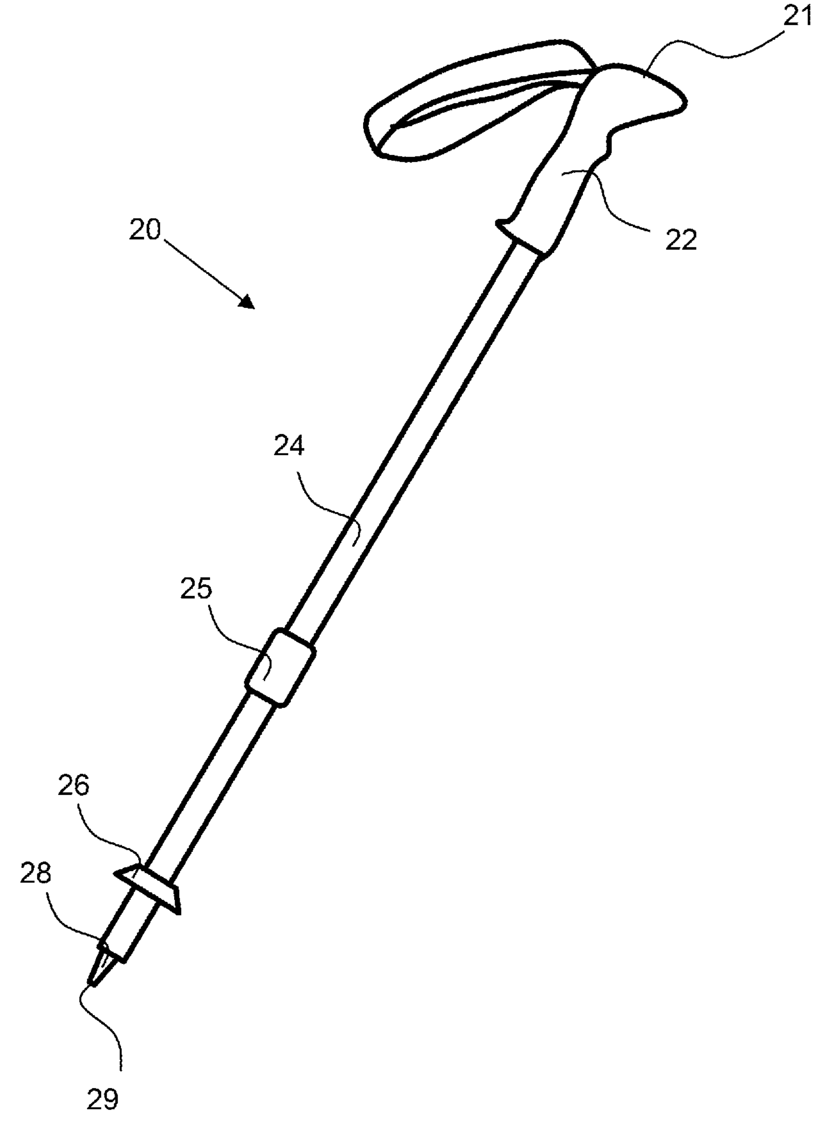
FIG. 10 shows a side view of an exemplary hiking pole extending from a handle end to a tip end and having a basket configured proximal to the tip end and extending radially outward from the pole shaft.
Figure 11:
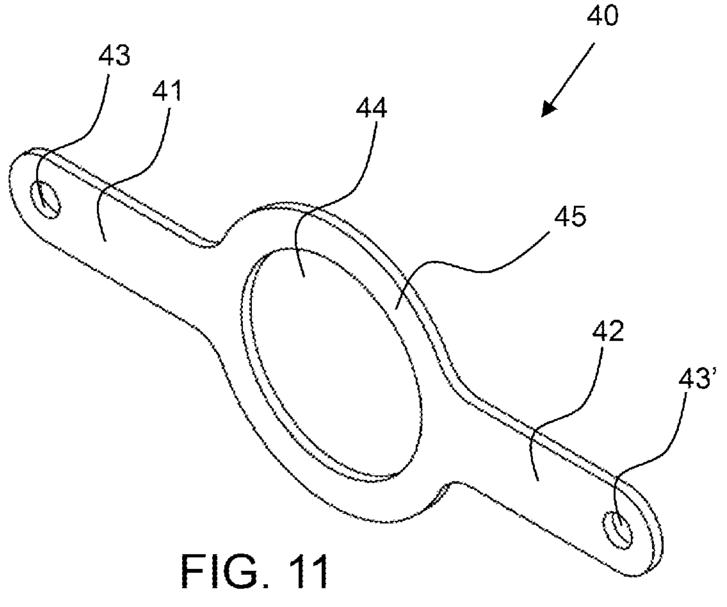
FIG. 11 shows a perspective view of a container adaptor having an adaptor opening configured to extend over a container mouth and two adaptor extensions each having an adaptor extension aperture configured to extend over the first and second retainer hooks of the container prop.

As shown in FIG. 10, a hiking pole 20 extends from a handle end 21 to a tip end 29 and has a basket 26 configured proximal to the tip end and extending radially outward from the pole shaft. The container prop is configured to detachably attach to the pole shaft 24 of the hiking pole just above the basket, wherein the basket will prevent the container prop from sliding off the hiking pole. The hiking pole has a tip 28 on the tip end 29 and a handle 22 on the handle end 21 and may also have a locking mechanism 25 to adjust the length of the hiking pole, wherein one segment of the pole shaft may slide into a second portion of the pole shaft.

Referring now to FIGS. 11 to 15, a water collection system 10 may also include a container adaptor 40 configured to couple a liquid container 30 to the container prop 50, or more specifically to the retainer components 60, 60', such as retainer hooks 61, 62 of the container prop. A container adaptor 40 has an adaptor opening 44 configured to extend around a container mouth 39 of the liquid container 30 and a first adaptor extension 41 and second adaptor extension 42 extending in opposing directions from the adaptor opening and each having an adaptor extension aperture, configured to extend around a respective retainer hook. An adaptor opening ring 45 may extend around the adaptor opening 44 and maybe ring shaped.

An adaptor opening diameter 48 may be sized to fit conventional flexible and hard water containers and may be substantially 100 mm or from about 95 mm to about 105 mm to ensure a tight fit on the liquid container. A standard hard bottle used for backpacking typically has a 100-415 thread, a standard closure size. The designation "100-415" refers to a 100 mm outer diameter with a 415 neck finish, defining the thread style and dimensions. This wide-mouth design allows for convenient filling, pouring, and cleaning. The 100-415 thread is a relatively large opening also that better enables quick filling by submersion and also better airflow during dispensing. The adaptor opening diameter may therefore be about 25 mm or more, about 40 mm or more, about 50 mm or more, about 100 mm or more and any range between and including the diameters provided.

Figure 14:
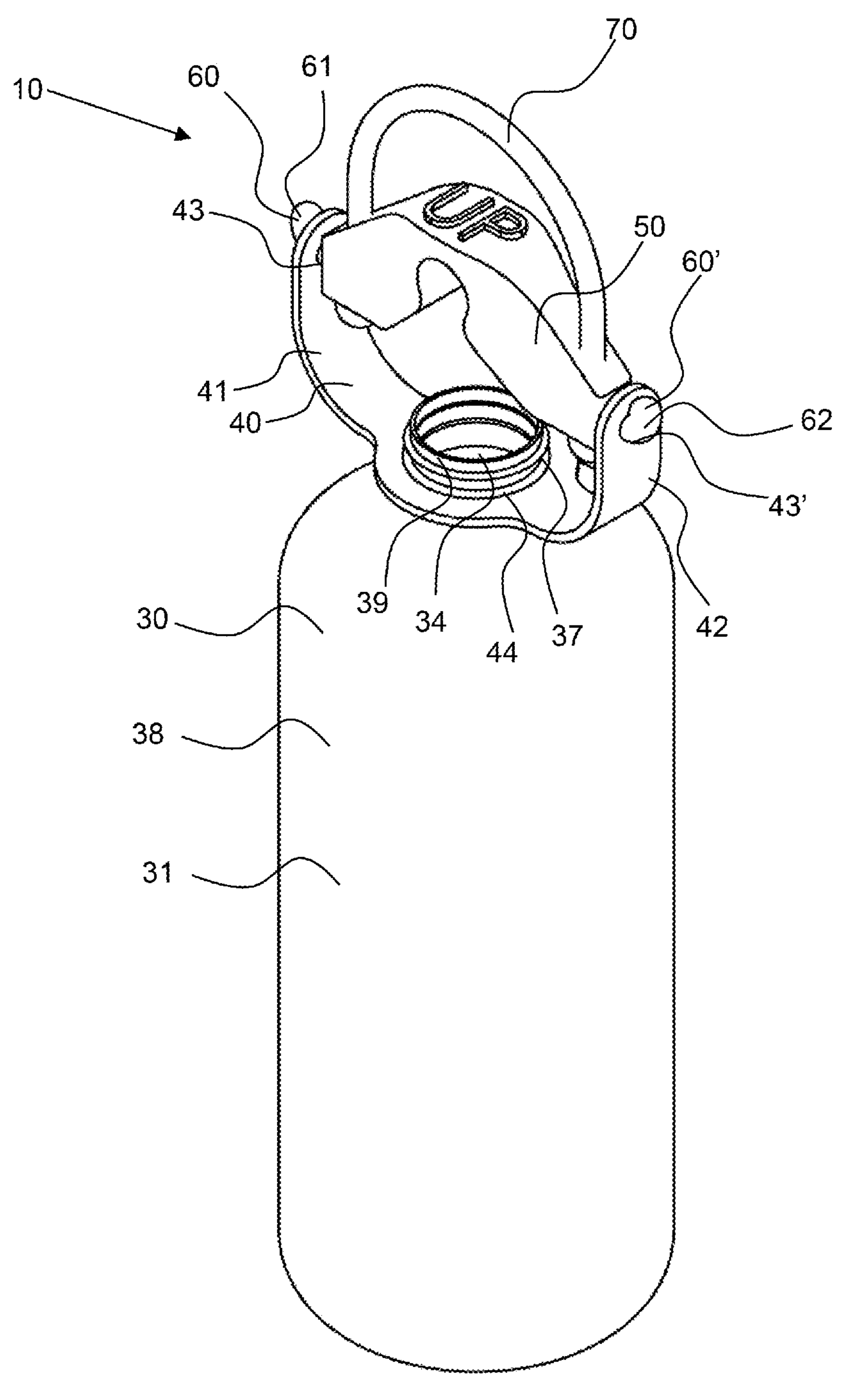
FIG. 14 shows a perspective view of a water collection system that includes a container prop and a container adaptor coupled to the retainer hooks of the container prop and also coupled to the container mouth of the liquid container, a bottle.

The first adaptor extension 41 and second adaptor extension 42 each have an adaptor length 46 that is long enough to extend to the retainer hooks 61, 62, respectively, on opposing sides of the container prop 50, as shown in FIG. 14. In FIG. 14, the container adaptor 40 is coupling together the liquid container 30, a bottle 38 with the adaptor opening 44 configured around the container mouth 39 and over the mouth threads 37 of the container mouth, and with the two adaptor extensions extending to the retainer hooks with the adaptor extension apertures 43, 43' configured over and on the respective retainer hooks 61, 62. The mouth threads 37 may be larger in diameter than the container mouth 39 and these threads may further ensure that the liquid container 30 is retained to the container adaptor during retrieving water and transporting a filled liquid container on the container prop and container adaptor. The liquid container 30 has a container mouth 39 and a liquid retainer portion 31 coupled to the mouth and as shown the liquid retainer portion 31 is rigid, a rigid bottle but may be a flexible liquid retainer portion, such as a hydration bladder or collapsible bottle.

Figure 12:
FIG. 12 shows a side view of the container adaptor shown in FIG. 11.
Figure 13:
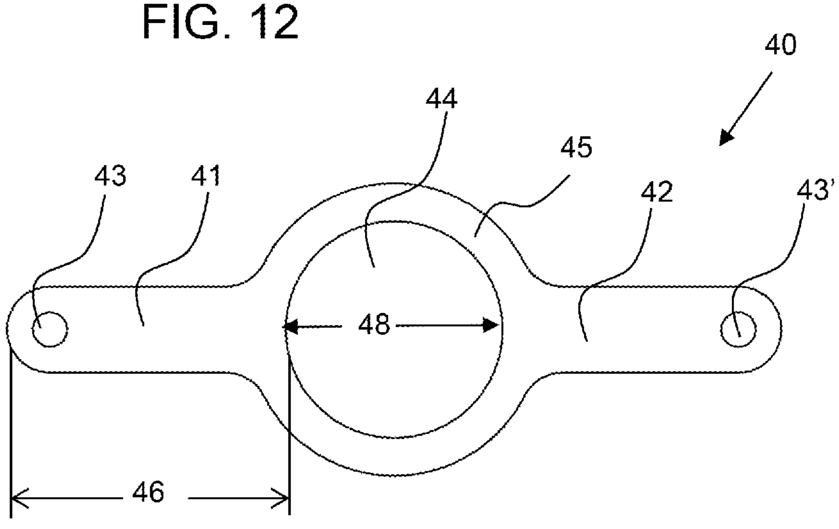
FIG. 13 shows a top view of the container adaptor shown in FIG. 11.

The container adaptor may be thin, as shown in FIG. 12, having a thickness of about 10 mm or less, about 8 mm or less, about 5 mm or less and any range between and including the values provided. The container adaptor may be made of a flexible material that enables the adaptor opening 44 to be enlarged slightly to extend over a container mouth and securely retain the liquid container during retrieving water. The container adaptor may be elastic, wherein the container adaptor can be deformed, such as enlarging the adaptor opening, and then rebound back to an original shape, size or length upon removal of the deforming force.

Figure 15:
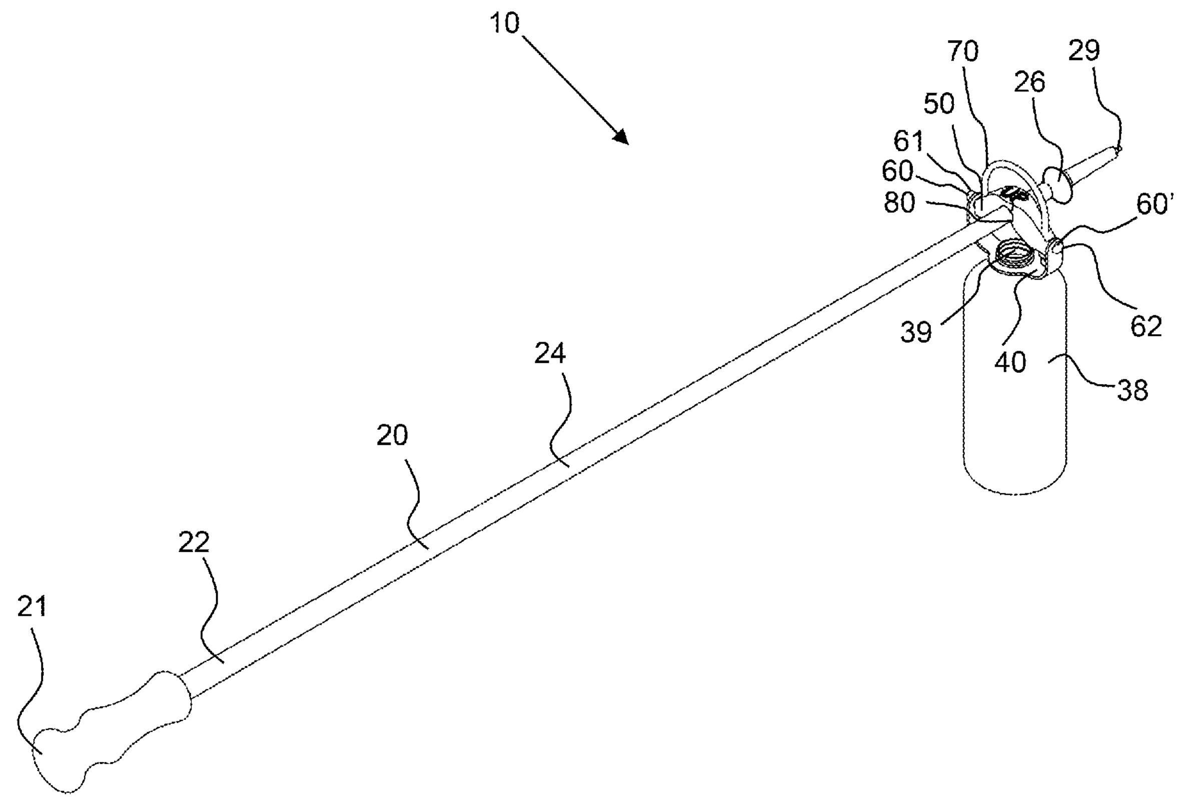
FIG. 15 shows a perspective view of a water collection system that includes a container prop and a container adaptor shown in FIG. 14 and also the hiking pole with the pole shaft extending through the pole seat of the container prop to enable water to be retrieved from a body of water from a distance.

As shown in FIG. 15, the liquid container 30, a bottle 38 is secured to the elongated member 23 of a hiking pole 20, via the container adaptor 40 and the container prop 50. The liquid container 30 is secured to the container adaptor 40 by the adaptor opening ring 45 and the container adaptor is secured to the container prop by the two adaptor extensions that extend to the retainer components 60, 60', retainer hooks 61, 62. The pole shaft 24 of the hiking pole 20 retains the container prop 50 thereto with the pole shaft 24 extending through the pole seat 80 of the container prop. A bottle may be rigid and retain a shape and be free standing on a base.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention covers the modifications, combinations and variations of this invention provided they come within the scope of the appended claims and their equivalents.

What is claimed is:

1. A water collection system comprising:

a) a container prop comprising:

i) a prop body extending from a first end to a second end;

ii) a first retainer component configured on the first end of the prop body;

iii) a second retainer component configured on the second end of the prop body;

iv) a pole seat comprising a pole seat aperture extending from a first side to a second side of the prop body;

wherein the first retainer component and the second retainer component are configured to detachably attach to a liquid container to hold a container opening open to retrieve liquid into the liquid container; and wherein the container prop is configured to detachably attached to an elongated member with the elongated member extending through the pole seat aperture of the pole seat; and whereby in use with the liquid container detachably attached to the container prop and the container prop detachably attached to the elongated member liquid may be collected into the liquid container by extending the elongated member and the liquid container to a water source and submerging the container opening in said water source.

2. The water collection system of claim 1, wherein the pole seat comprises a seat constricted opening to the pole seat, and wherein a width of the seat constricted opening is less than a diameter of the pole seat aperture.

3. The water collection system of claim 2, wherein the prop body further comprises a seat tapering surface that tapers from a base of the prop body to the seat constricted opening.

4. The water collection system of claim 2, wherein the prop body further comprises a pair of opposing seat tapering surface that each taper from a base of the prop body to the seat constricted opening and are configured on opposing sides of the seat constricted opening.

5. The water collection system of claim 1, wherein the first retainer component is a first retainer hook and wherein the second retainer component is a second retainer hook, and wherein the first retainer hook and the second retainer hook are configured to extend into a first container aperture and a second container aperture of the liquid container to hold the container opening open to retrieve liquid into the liquid container.

6. The water collection system of claim 5, wherein each of the first retainer hook and second retainer hook comprises:

an extension portion extending from the prop body;

a hook portion extending at an angle from the extension portion toward a top of the prop body.

7. The water collection system of claim 5, wherein each of the first retainer hook and second retainer hook comprises a hook head that is bulbous.

8. The water collection system of claim 5, wherein each of the first retainer hook and second retainer hook are configured more proximal to a base of the prop body than the pole seat aperture and a vertical offset distance from the pole seat aperture.

9. The water collection system of claim 5, wherein the container prop further comprises a handle extending from a top of the prop body.

10. The water collection system of claim 5, wherein the prop body has a first extension portion that extends from the first end to the pole seat aperture, and a second extension portion that extends from the second end to the pole seat aperture, and wherein the first extension portion and second extension portion are configured to flex away from the pole seat aperture to allow the shaft of the hiking pole to fit within the pole seat aperture.

11. The water collection system of claim 5, further comprising a container adaptor comprising:

a) a first adaptor extension and a second adaptor extension extending in opposing directions from the adaptor opening ring and each comprising an adaptor extension aperture configured;

wherein the first adaptor extension aperture is configured to extend over the first retainer hook and the second adaptor extension aperture is configured to extend over the second retainer hook to detachably attach the container adaptor to the container prop.

12. The water collection system of claim 11, wherein the container adaptor further comprises:

a) an adaptor opening ring configured around an adaptor opening;

wherein the adaptor opening and adaptor opening ring are configured to extend over a container mouth to detachably attach the liquid container to the container adaptor.

13. The water collection system of claim 12, wherein the container adaptor is flexible.

14. The water collection system of claim 12, wherein the container adaptor is elastic.

15. The water collection system of claim 12, wherein the adaptor opening has a diameter that is between 25 mm and 100 mm.

16. The water collection system of claim 15, wherein the container adaptor is elastic.

17. The water collection system of claim 1, further comprising the elongated member and wherein the elongated member is a hiking pole comprising:

i) a pole shaft;

ii) a handle end;

iii) a tip end; and iv) a basket that extends radially out from the pole shaft.

18. The water collection system of claim 17, further comprising the liquid container and wherein the liquid container further comprises:

i) a first container aperture; and ii) a second container aperture; and wherein the first retainer component is a first retainer hook and wherein the second retainer component is a second retainer hook, and wherein the first retainer hook is configured to extend into the first container aperture and the second retainer hook is configured to extend into the second container aperture of the liquid container to hold a container opening open to collect liquid into the liquid container.

19. The water collection system of claim 18, wherein each of the first retainer hook and second retainer hook comprise:

an extension portion extending from the prop body;

a hook portion extending at an angle from the extension portion toward a top of the prop body.

20. The water collection system of claim 19, wherein the liquid container is a hydration bladder.

21. The water collection system of claim 1, further comprising a container adaptor that is configured to detachably attach to the liquid container, wherein the container adaptor comprises:

a) an adaptor opening;

b) a first adaptor extension extending from the adaptor opening;

c) a second adaptor extension extending from the adaptor opening on an opposing side of the adaptor opening from the first adaptor extension;

wherein the adaptor opening is configured to extend over the container opening of the liquid container with the first adaptor extension retained to the first retainer component of the container prop and the second adaptor extension retained to the second retainer component of the container prop to retain the liquid container to the container prop.

22. The water collection system of claim 21, wherein the container adaptor is flexible.

23. The water collection system of claim 21, comprising the liquid container and wherein the liquid container is a bottle.

24. The water collection system of claim 21, comprising the liquid container and wherein the liquid container comprises a container mouth and flexible liquid retainer coupled thereto.

* * * * *